F. COONS & E. VAN WINKLE.
COTTON-GIN FEEDER.

No. 186,804.   Patented Jan. 30, 1877.

Witnesses
Chas. H. Smith
Harold Serrell

Inventor
Freeman Coons
Edward Van Winkle
per L. W. Serrell

United States Patent Office.

FREEMAN COONS, OF HUDSON, NEW YORK, AND EDWARD VAN WINKLE, OF ATLANTA, GEORGIA.

IMPROVEMENT IN COTTON-GIN FEEDERS.

Specification forming part of Letters Patent No. 186,804, dated January 30, 1877; application filed April 17, 1876.

*To all whom it may concern:*

Be it known that we, FREEMAN COONS, of Hudson, in the State of New York, and EDWARD VAN WINKLE, of Atlanta, in the State of Georgia, have invented an Improvement in Cotton-Gin Feeders, of which the following is a specification:

In Letters Patent No. 146,877, heretofore granted to T. C. Craven, a cylinder is represented with teeth that are projected and retracted by a stationary eccentric shaft, around which the cylinder is revolved. There is a feeding-apron beneath such cylinder, conveying the cotton from a hopper, and the teeth keep back the surplus cotton.

Our present invention is made for rendering the feeder very simple, effective, and easily operated and adjusted.

We employ a feeding-belt of slats to convey the cotton from the hopper to the ginning-cylinder, said belt passing below the cylinder of teeth that keeps back surplus cotton, and below the belt and said cylinder an adjustable roller is placed that keeps up the belt in the proper position relatively to the said cylinder, so that a mouth or opening exists between the belt and the teeth upon such cylinder of a width adapted to pass the proper quantity of cotton along to the gin, and by raising this roller the belt will be brought nearer to the teeth and the quantity of cotton passing through will be lessened, and the reverse. By this means the cylinder of teeth does not require any adjustment, and the parts are made firm and reliable and with less cost than heretofore.

Figure 1:
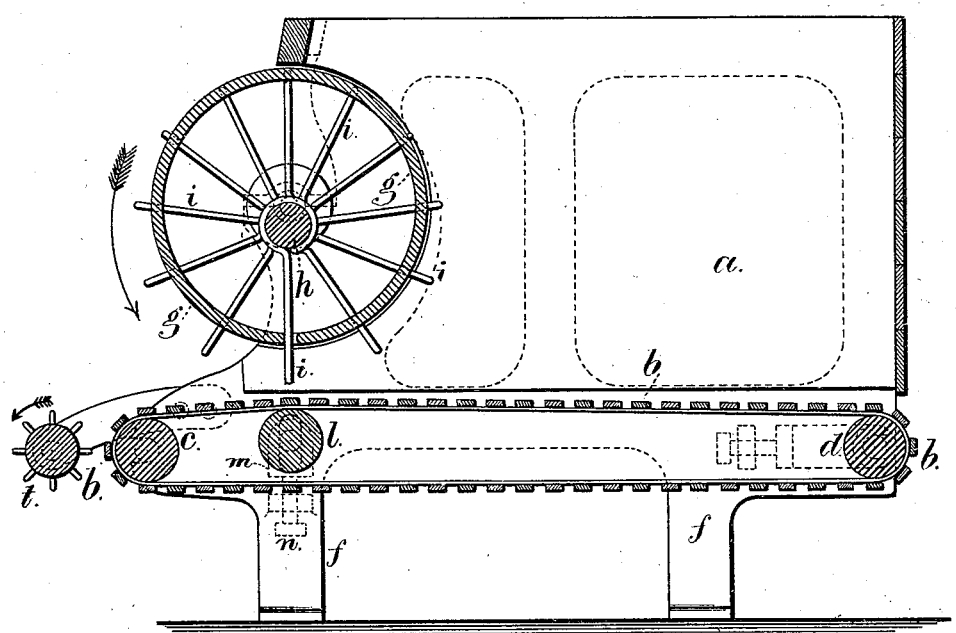
Figure 2:
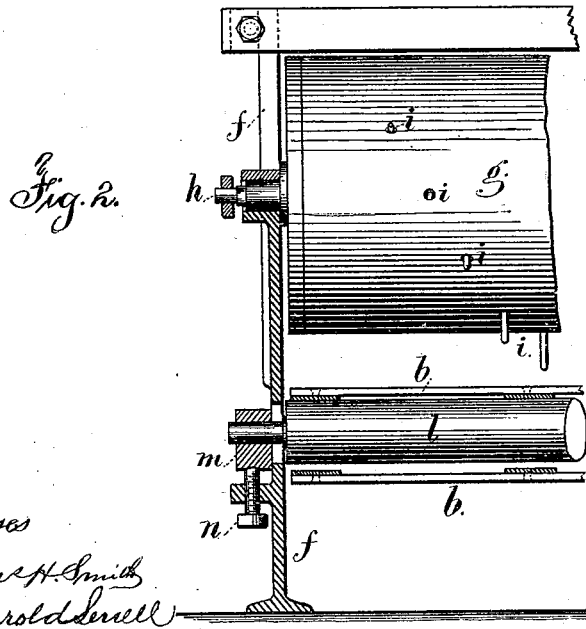

In the drawing we have represented the improvement by Figure 1, which is a vertical section transversely of the cylinder, and Fig. 2, which is a section at one side of the feeding-belt.

The hopper $a$ is of suitable size, the bottom of which is formed by the belt of slats $b$, that pass over the rollers $c$ and $d$, that are supported in the frame $f$, and to one of these rollers $d$ the power is applied to revolve said belt. The cylinder $g$ is hollow, and it is revolved upon the end portions of the stationary shaft $h$, and this shaft $h$ is made in its middle portion eccentric, to receive the eyes $a$ at the inner ends of the wire teeth $i$, which teeth pass through holes in the cylinder $g$, so that, as said cylinder $g$ is revolved, the eccentric portion of the shaft $h$ draws the teeth within the cylinder at the upper portion of the cylinder and projects them at the lower portion, adjacent to the belt, and this cylinder runs in the direction of the arrows and prevents the cotton being conveyed by the belt too rapidly into the ginning machinery.

The distance that exists between the teeth $i$ of the cylinder $g$ and the belt $b$ will determine the thickness of the layer of cotton that will pass beneath the cylinder $g$ upon the belt $b$, and in order to vary the thickness of this layer the roller $l$, that is beneath the said belt $b$, is adjustable, the bearings $m$ of such roller $l$ resting upon the screws $n$, that can be raised or lowered, and so lift the belt $b$ nearer to the teeth $i$ and lessen the quantity of cotton passing along upon that belt, or the reverse, and this adjustment can be made by an ordinary attendant.

It is preferable to employ a clutch between the ginning-cylinder and the feed-cylinder and belt, so that the belt and feed can be stopped while the ginning-cylinder continues to run.

As the cotton passes along the belt toward the gin there are frequently nails, pieces of iron, and other foreign substances upon the belt, and if these fall into the gin the teeth are injured. We, therefore, apply a lifting-roller, $t$, armed with teeth, that raise the bat of cotton and deliver it to the gin, and heavy materials fall away between the roller and belt. This roller is driven by a belt or otherwise in the direction indicated.

We claim and desire to secure by Letters Patent—

The combination, with the cylinder $g$, teeth $i$, eccentric shaft $h$, and feeding-belt $b$, of the roller $l$, beneath the belt $b$ and cylinder $g$, and the adjustable bearings for said roller $l$, substantially as set forth.

Signed by us this 9th day of March, 1876.

FREEMAN COONS.
EDWARD VAN WINKLE.

Witnesses:
J. H. STARK,
J. D. GRAHAM.